US011507820B1

(12) United States Patent
Varrichio et al.

(10) Patent No.: US 11,507,820 B1
(45) Date of Patent: Nov. 22, 2022

(54) AUTOMATED GENERATION OF DELIVERY DATES USING MACHINE LEARNING

(71) Applicant: Dell Products L.P., Round Rock, TX (US)

(72) Inventors: Craig A. Varrichio, Round Rock, TX (US); Yuvaraj V. Vimawala, Round Rock, TX (US); Dishank K. Kamath, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1236 days.

(21) Appl. No.: 15/896,729

(22) Filed: Feb. 14, 2018

(51) Int. Cl.

| | |
|---|---|
| ***G06N 3/08*** | (2006.01) |
| ***G06K 9/62*** | (2022.01) |
| ***G06N 5/00*** | (2006.01) |
| ***G06N 20/20*** | (2019.01) |
| ***G06Q 10/08*** | (2012.01) |
| ***G06F 17/00*** | (2019.01) |

(52) U.S. Cl.
CPC ............. *G06N 3/08* (2013.01); *G06K 9/6256* (2013.01); *G06K 9/6282* (2013.01); *G06N 5/003* (2013.01); *G06N 20/20* (2019.01); *G06Q 10/083* (2013.01)

(58) Field of Classification Search
CPC .......... G06N 3/08; G06N 5/003; G06N 20/20; G06K 9/6256; G06K 9/6282; G06Q 10/083
See application file for complete search history.

(56) References Cited

U.S. PATENT DOCUMENTS

2003/0126103 A1* 7/2003 Chen ..................... G06Q 10/08 706/50
2008/0097865 A1* 4/2008 Forlani .............. G06Q 30/0603 705/26.5
2019/0180229 A1* 6/2019 Phillips .............. G06Q 10/0833
2019/0205828 A1* 7/2019 O'Hara .................. G06N 7/005

* cited by examiner

*Primary Examiner* — Quoc A Tran
(74) *Attorney, Agent, or Firm* — Ryan, Mason & Lewis, LLP

(57) ABSTRACT

An apparatus in one embodiment comprises at least one processing platform including a plurality of processing devices. The processing platform is configured to receive a request to execute one or more predictive models for generating a delivery date, to initiate execution of the one or more predictive models responsive to the request, and to invoke a plurality of machine learning algorithms using data from a plurality of data sources when executing the one or more predictive models. The processing platform is further configured to capture the data from the plurality of data sources and organize the data into a sparse matrix, to automatically generate the delivery date, and to automatically transmit the delivery date to one or more user devices.

20 Claims, 11 Drawing Sheets

100

USER DEVICE
102-1
USER DEVICE
102-2
. . .
USER DEVICE
102-N
NETWORK(S)
104
PREDICTIVE SERVICES PLATFORM
105
APPLICATION LAYER
106
RDD ENGINE
107
COMMUNICATIONS MANAGER
109
LOGIC LAYER
112
EXECUTION MODULE
114
TRAINING MODULE
116
DATA SCIENCE PLATFORM
118
DATA LAYER
120
DATA HUB
122
SUPPLY CHAIN DATA
124-1
ORDER DATA
124-2
LEAD TIME DATA
124-3
DELIVERY DATA
124-4
FULFILLMENT DATA
124-5

```
prepareData<-function(project,dat,dataset)
{

require(Matrix.utils)
require(Matrix)

  if (!is(dat,"Matrix"))
  {
    pivot<-NULL
    pivots<-NULL

    if(!is.null(dataset$columns))
    {
      form<-as.formula(paste(dataset$key," ~ ",
paste(dataset$columns, collapse= "+")))
      pivot<-dMcast(dat,form,fun.aggregate = 'mean')
      pivot@x[is.na(pivot@x)]<- -1
      pivot<-pivot[,which(colSums(pivot)>.0001*nrow(pivot))]
    }
```

```
  if(!is.null(dataset$numerics))
  {
    pivots<-lapply(dataset$numerics, function (col)
     {
       dat[is.na(dat[,col]),col]<-0
       form2<-as.formula(paste(dataset$key," ~ ", paste(dataset$factors, collapse= "+")))
       pivot2<-dMcast(dat,form2,value.var = col,fun.aggregate = 'mean')
       pivot2@x[is.na(pivot2@x)]<- -1
       pivot2<-pivot2[,which(colSums(pivot2)>.0001*nrow(pivot2))]
       colnames(pivot2)<-paste0(colnames(pivot2),col)
       return(pivot2)
     }
    )
  }
  result<-do.call(cbind,c(pivot,pivots) %>% as.list())
 }
 return(result)
```

505

```
createNTTM<-function(data,reload=TRUE)
{
  flog.trace("Received data:")
  flog.trace(capture.output(str(data)))

  project$dataStr<-lapply(data,function (x) head(x,1) %>% mutate_if(is.factor, as.character))

  require(dplyr)
  require(Matrix.utils)

  nttms<-Map(function (x,y) prepareData(project,x,y),data,project$datasets)
  nttms<-lapply(nttms,function (nttm) {nttm@x[is.na(nttm@x)]<- -1; return(nttm)})
  nttms<-lapply(nttms,function (nttm) nttm[,which(colSums(nttm!=0)>.00001*nrow(nttm))])

  flog.trace("Pivoted data:")
  flog.trace(capture.output(str(nttms)))
```

```
flog.debug('Joining datasets...')

lookupList<-Map(function (dataset,data) unique(data[,c(dataset$key,dataset$alternateKey),drop=FALSE]),project$datasets,data)
lookup<-Reduce(dplyr::inner_join,lookupList)

lookup<-lookup[match(rownames(nttms[[1]]),lookup[,project$datasets[[1]]$key]),]

if(length(data)>1) {
  nttm<-Reduce(function (x,index) {
    merge.Matrix(x,nttms[[index]],
            by.x=lookup[match(rownames(x),lookup[,project$datasets[[1]]$key]), project$datasets[[index]]$key],
            ,by.y=rownames(nttms[[index]]),all.x=FALSE,all.y=FALSE)
  }, 2:length(data),nttms[[1]])
}
```

```
nttm@x[is.na(nttm@x)]<- -1

flog.debug('Adding transforms...')

cols<-unlist(lapply(project$datasets,function (x) x$columns))
cols<-intersect(colnames(nttm),cols)

cols<-intersect(colnames(nttm),union(colnames(nttm)[colMeans(nttm)>1],cols))

transforms<-lapply(project$transforms,function(f, ...) f(...),nttm[,cols])

nttm<-Reduce(function (x,y) cbind(x,as(y,'dgCMatrix')),transforms,nttm
```

```
nttm<-nttm[order(nttm[,project$orderBy]),]


 return(nttm)
}
```

511

```
flog.debug(paste("Removing columns that don't occur at least",.0001*nrow(nttm),"times."))
  keep<-which(colSums(nttm!=0)>.0001*nrow(nttm))
  flog.debug(paste(ncol(nttm)-length(keep),"columns removed."))
  nttm<-nttm[,keep]

  flog.debug(paste("Inverse of above rule."))
  keep<-which(colSums(nttm==1)<.9999*nrow(nttm))
  flog.debug(paste(ncol(nttm)-length(keep),"columns removed."))
  nttm<-nttm[,keep]

  if(is.null(nttm))
    stop("The final data set (nttm) is not populated")
```

```
goodCor<-t(nttm) %*% project$trainDataOutcome
goodCor<-goodCor[,1]
goodCor<-goodCor/(sqrt(colSums(nttm^2)*sum(project$trainDataOutcome^2)))

badCor<-t(nttm) %*% nttm[,project$orderBy]
badCor<-badCor[,1]
badCor<-badCor/(sqrt(colSums(nttm^2)*sum(nttm[,project$orderBy]^2)))

flog.debug(paste('Removing columns',paste(colnames(nttm)[which(abs(badCor) > abs(goodCor) & abs(badCor) > .6)],collapse = ', ')))
nttm<-nttm[,!(abs(badCor) > abs(goodCor) & abs(badCor) > .6)]
```

```
a<-abs(colMeans(nttm[project$indices[[1]],])-colMeans(nttm[project$indices[[2]],]))/colSD(nttm)
  flog.debug(paste('Removing columns',paste(colnames(nttm)[which(a>.5)],collapse = ', ')))
  nttm<- nttm[,which(a<=.5)]
  dim(nttm)
```

```
lapply(nttm,(function (x) try(ks.test(as.numeric(na.omit(x)),'punif',min(as.numeric(x),na.rm = TRUE),max(as.numeric(x),na.rm =
TRUE))$statistic))) %>% Filter(function (x) x<.2,.) %>% names -> ids
nttm[,ids]<-NULL
```

607

PROCESSING DEVICE
NETWORK INTERFACE
PROCESSOR
MEMORY
814
810
812
802-1
PROCESSING DEVICE
802-K
NETWORK
PROCESSING DEVICE
802-3
PROCESSING DEVICE
802-2
804
800

AUTOMATED GENERATION OF DELIVERY DATES USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to the development of predictive models for the automatic generation of revised delivery dates.

BACKGROUND

When customer orders are put on a hold, due to, for example, a failure to receive or process payment, part shortages, fraud, and/or compliance problems, a revised delivery date (RDD) of the order is generated. Conventional information processing systems use outdated linear models to calculate RDD using static and delayed data, and manually input lead times, leading to inaccurate delivery commitments. As a result, compliance with RDDs calculated using conventional methods has been very low (e.g., <10%). This adversely impacts order experience when delivery commitments are missed, especially when orders are on extended lead times or holds, leading to support calls, early or late delivery, and/or incorrect notifications regarding order status.

Accordingly, there is a need for improved information processing systems, which can generate more accurate revised delivery commitments.

SUMMARY

Illustrative embodiments provide a predictive services platform which utilizes machine learning develop predictive models (e.g., algorithms) to automatically generate RDDs. In accordance with an embodiment of the present invention, the development of the predictive models and the predictive calculations are based on boosted decision trees and neural networks to increase accuracy of generated RDDs. For example, some embodiments are configured to improve accuracy of RDD calculation and reduce multiple RDDs by using machine learning incorporating expanded variables and real time data into the delivery date calculation. Embodiments of the present invention further provide a data science platform (e.g., a cloud-based data science platform) that enables data scientists to collaborate, experiment, re-use data sources, measure performance and manage versioning of data science models. Embodiments of the present invention also provide a scalable, high velocity, and highly available database of order information structured specifically for data science. Such embodiments can advantageously provide significantly improved accuracy and efficiency in RDD generation, enabling order communication that is consistent, clear, accurate and timely, and early identification of and proactive actions on orders at risk of missing initial delivery commitments. According to embodiments of the present invention, the predictive services and data science platforms are cloud-based platforms.

In one embodiment, an apparatus comprises at least one processing platform including a plurality of processing devices. The processing platform is configured to receive a request to execute one or more predictive models for generating a delivery date, initiate execution of the one or more predictive models responsive to the request, and invoke a plurality of machine learning algorithms using data from a plurality of data sources when executing the one or more predictive models. The processing platform is also configured to capture the data from the plurality of data sources and organize the data into a sparse matrix, automatically generate the delivery date, and automatically transmit the delivery date to one or more user devices.

These and other illustrative embodiments include, without limitation, apparatus, systems, methods and computer program products comprising processor-readable storage media.

BRIEF DESCRIPTION OF THE DRAWINGS

FIGS. 5A-5F show examples of pseudocode for creation of a sparse matrix in illustrative embodiments.

FIGS. 6A-6D show examples of pseudocode for implementation of heuristics in illustrative embodiments.

DETAILED DESCRIPTION

Figure 1:
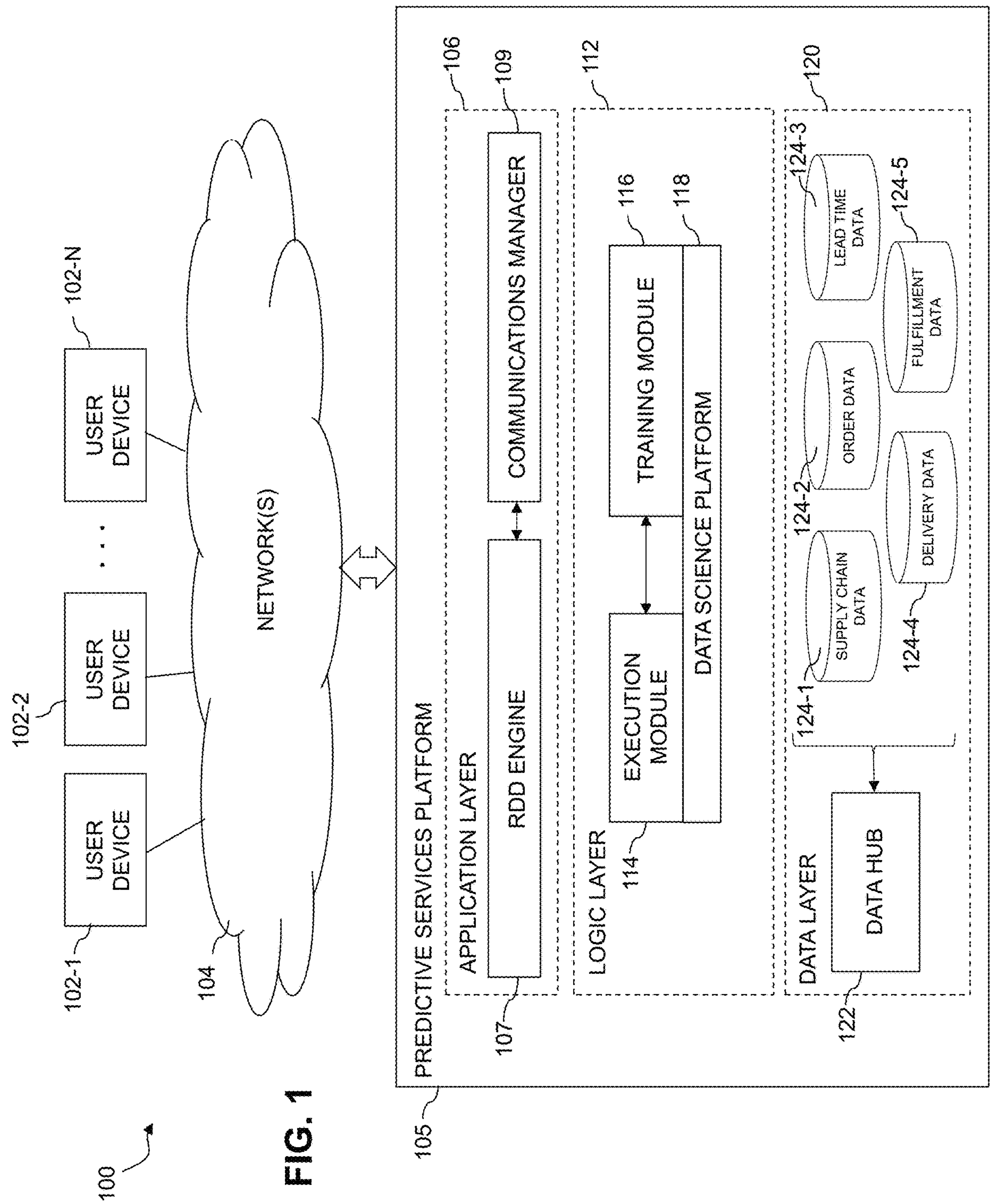
FIG. 1 is a block diagram of an information processing system comprising a predictive services platform configured for automated generation of RDDs using machine learning in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Windows Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein a "data hub" refers to a database populated with data from a plurality of sources and from which data is taken to one or more destinations. Alternatively, a data hub has more than one source populating it, and/or more than one destination to which the data is moved.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

FIG. 1 shows an information processing system 100 configured in accordance with an illustrative embodiment. The information processing system 100 comprises user devices 102-1, 102-2, . . . 102-N. The user devices 102 communicate over a network 104 with a predictive services platform 105.

The user devices 102 can comprise, for example, desktop, laptop or tablet computers, mobile telephones, or other types of processing devices capable of communicating with the predictive services platform 105 over the network 104. The variable N and other similar index variables herein such as K and L are assumed to be arbitrary positive integers greater than or equal to two.

The term "user" herein is intended to be broadly construed so as to encompass numerous arrangements of human, hardware, software or firmware entities, as well as combinations of such entities. Predictive services are assumed to be provided for users under one or more machine learning models, although it is to be appreciated that other types of infrastructure arrangements could be used. At least a portion of the available predictive and machine learning services in some embodiments may be provided under Function-as-a-Service ("FaaS") and/or Platform-as-a-Service (PaaS) models, including cloud-based FaaS and PaaS environments.

The predictive services platform 105 in the present embodiment is assumed to implement at least a portion of a machine learning environment accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The predictive services platform 105 implements predictive services in connection with RDD generation on behalf of respective infrastructure tenants each corresponding to one or more users associated with respective ones of the user devices 102. According to an embodiment, the infrastructure tenants are cloud infrastructure tenants. By way of example, the predictive services are assumed to include execution and training of one or more machine learning applications on behalf of each of one or more users associated with respective user devices 102, wherein the machine learning applications use an expanded universe of data (including real-time data) to automatically generate RDDs in connection with delayed customer orders. The predictive services incorporate a data science platform, which can be used to allow data scientists to develop and manage machine learning models. The predictive services also rely on dynamic data concerning, for example, supply chains, orders, lead times, delivery details and fulfillment information.

The predictive services platform 105 in some embodiments may be implemented as part of cloud infrastructure in the form of a cloud-based system such as an AWS system. Other examples of cloud-based systems that can be used to provide at least portions of the predictive services platform 105 and possibly other portions of system 100 include GCE, Windows Azure®, and Domino Data Science Platform.

The predictive services platform 105 in the embodiment of FIG. 1 illustratively comprises an application layer 106, a logic layer 112 and a data layer 120. The logic layer 112 includes execution and training modules 114 and 116, which apply machine learning techniques to data attributes 124-1, 124-2, 124-3, 124-4 and 124-5 from the data layer 120 in order to develop predictive models and generate RDDs in connection with multiple orders and scenarios. The data attributes are not necessarily limited to the illustrated data attributes 124-1 to 124-5 and may include additional or alternative data attributes. The application layer 106 includes an RDD engine 107, which sorts generated RDDs to correspond to the appropriate orders, and a communications manager 109, which manages communication and alerts of the generated RDDs over the network(s) 104 to the appropriate parties via user devices 102-1 to 102-N. Appropriate parties may include, for example, customers waiting for an order, or enterprise personnel or contractors involved in the fulfillment of an order who may need to know about an RDD or take appropriate actions to comply with the RDD, including, but not necessarily limited to, sales representatives, engineers, manufacturers, operations and escalation team members, and/or cargo/transportation service providers.

In more detail, the execution module 114 uses a unique combination of machine learned algorithms and an expanded set of data attributes to automatically generate more accurate RDDs than in conventional systems. The training module 116 uses historical data to train predictive models, which are scored against the actual delivery date to define early, on time and late metrics for use in connection with the RDD predictions. The trained predictive models are used by the execution module 114 to generate RDDs based on different circumstances causing modification of delivery dates, including real-time changes to order conditions as described in more detail herein.

Figure 2:
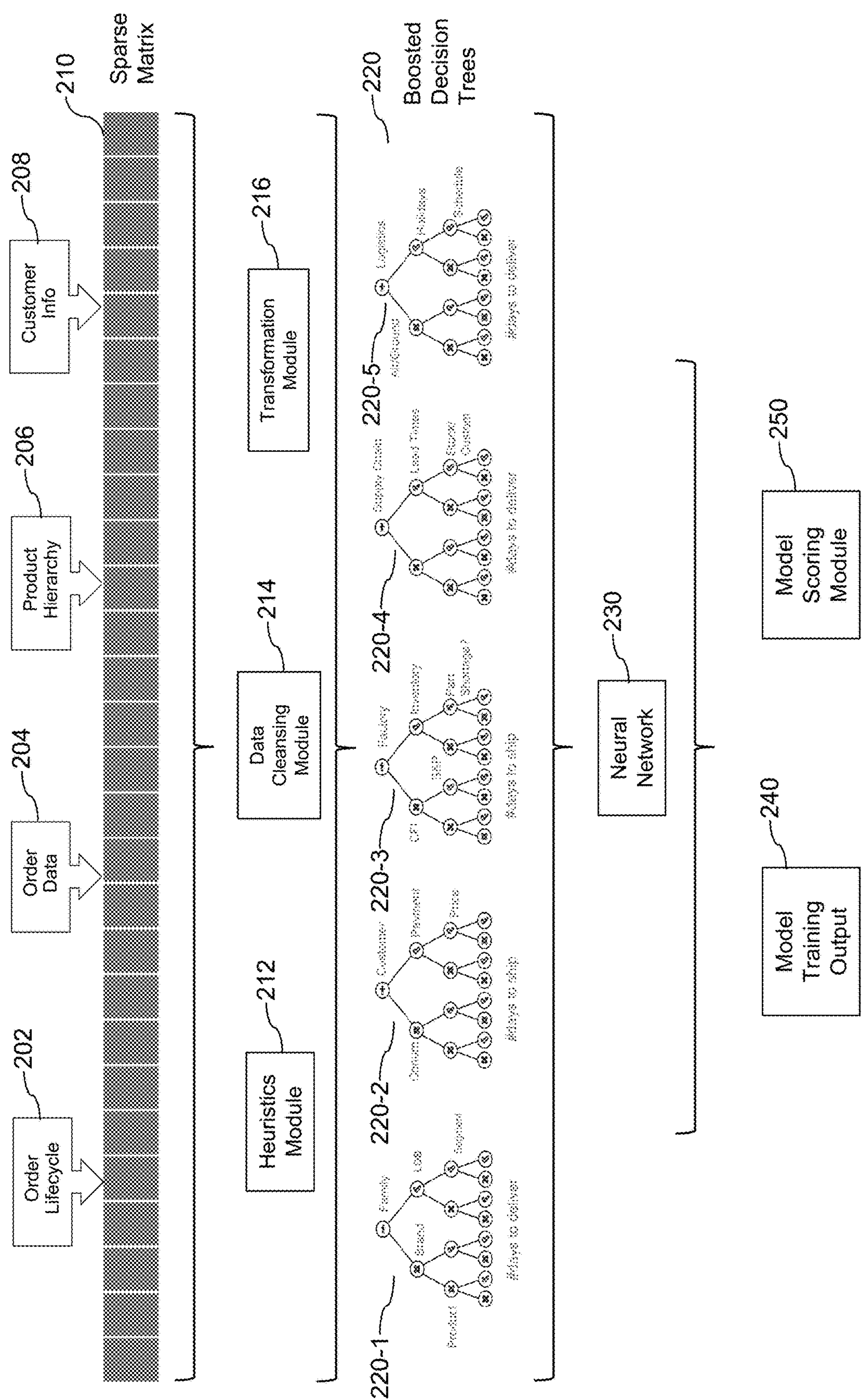
FIG. 2 is a diagram showing machine learning modules in a predictive services platform in an illustrative embodiment.

Further, as described in more detail herein with respect to FIG. 2, the logic layer 112 utilizes one or more sparse matrices to capture a wide set of data attributes, which achieves large memory reduction relative to conventional systems. The logic layer 112 also uses heuristics, cleansing and transformation techniques to reduce, clean and/or transform the incoming data. The logic layer 112 uses boosted decision trees to arrive at different RDD calculations based on complex product and customer data, and uses a neural network to optimally combine the results from the decision trees.

Figure 3:
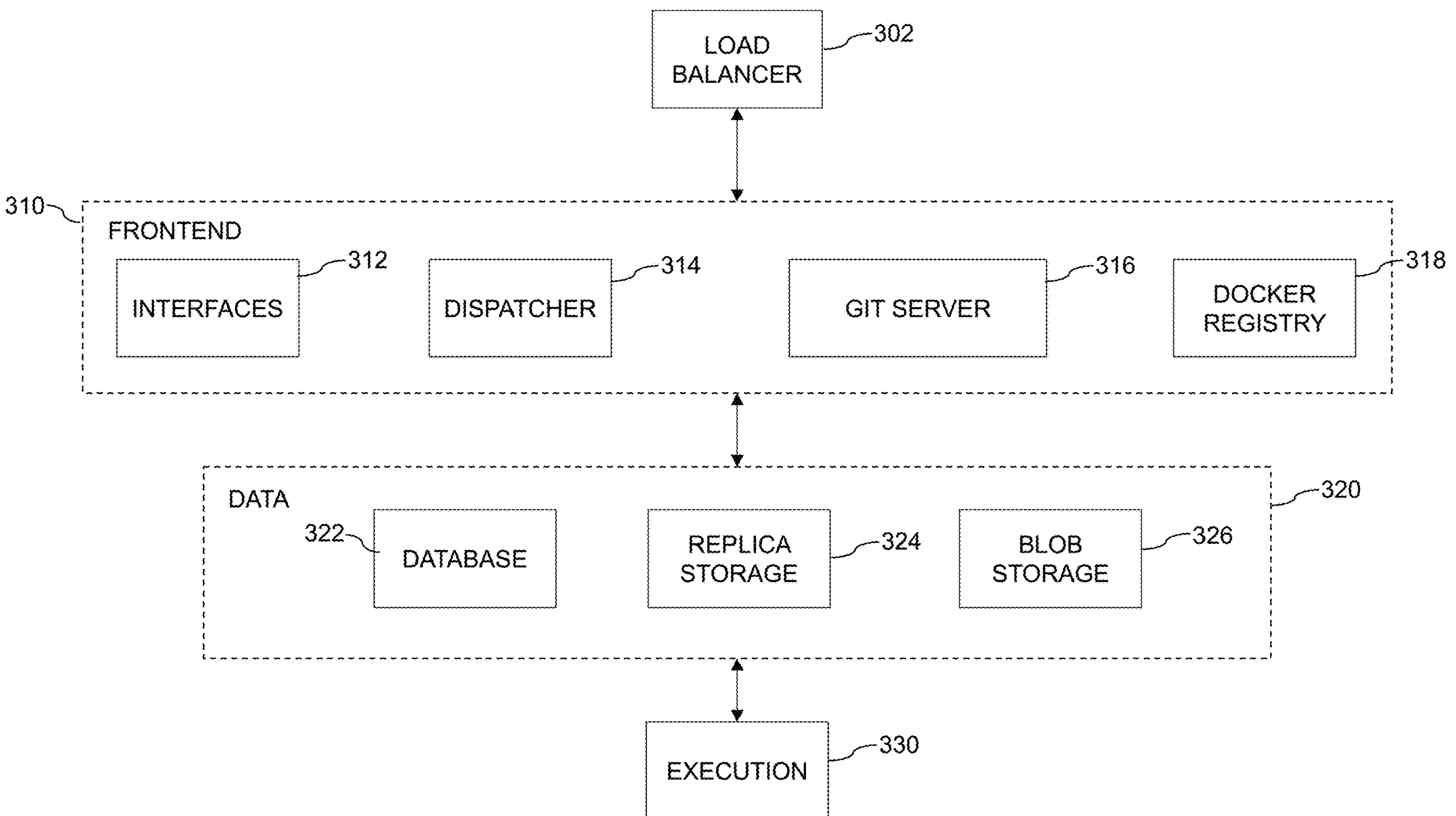
FIG. 3 is a block diagram of a data science platform architecture in an illustrative embodiment.

The logic layer 112 runs on a data science platform 118, which is described further herein in connection with FIG. 3. The data science platform 118 is accessed by data scientists and permits the data scientists to collaborate, experiment, re-use data sources, measure performance and manage versioning of data science models being used to predict the RDDs. The data science platform 118 provides the necessary tools in a collaborative workspace for data scientists to create and perform interactive experiments on predictive models and generate application programming interfaces (APIs), and interactive applications and reports for the predictive models. The data science platform 118 enables data scientists to run multiple experiments in parallel and publish results on interactive interfaces.

In accordance with an embodiment of the present invention, the data science platform 118 is a long term scalable platform that enables versioning, model management, re-use and collaboration between data scientists, provides support for various modelling languages, including, but not necessarily limited to R, Python, SAS, and/or Jupyter etc., and provides cloud-based scalability or scalability like that in a cloud-based platform for hardware to enable predictive experiments. The data science platform 118 can also be utilized for multiple business use cases, including, but not necessarily limited to, marketing, supply chain, sales, support and order experience. At least portions of the data science platform 118 can be provided by the Domino Data Science Platform.

The data layer 120 illustratively comprises a data hub 122 including a database service, such as, but not necessarily limited to GCE Cloud Storage, Microsoft Azure Blob (Binary Large Object) Storage, DynamoDB, MongoDB, Amazon Aurora and Oracle database. The data hub 122 comprises a scalable, high velocity and highly available database, which can scale to real-time high performance needs, such as during peak selling and delivery periods (e.g., holiday season). The data hub 122 is populated with data from a plurality of sources. The data includes real-time data, such as, for example, up to date changes to conditions affecting order fulfillment, and historical data, such as, for example, historical data on RDDs and factors affecting their calculation. The data populating the data hub 122 includes, but is not necessarily limited to, supply chain data 124-1, order data 124-2, lead time data 124-3, delivery data 124-4 and fulfillment data 124-5. The supply chain data 124-1 can include, inventory information, product or material shortages, manufacturing equipment problems, warehouse location, shipping methods and/or problems associated therewith, weather, and/or natural disasters. The supply chain data 124-1 includes real-time updates, such as, for example, alerts regarding changes in the supply chain, due to, for example, product or material shortages, manufacturing equipment problems, problems associated with shipping methods, weather incidents, and/or natural disasters. Order data 124-2 can include, for example, order number, item number, stock keeping unit (SKU) codes, customer information, payment information, payment holds, fraud, customization (during manufacturing and post-manufacturing), and quantity information, and any real-time changes thereto. Lead time data 124-3 can include, for example, the lead time of an order (e.g., actual or estimated time between order placement and fulfillment), amount of time elapsed since order placement, original estimated delivery date, amount of time elapsed in each manufacturing phase, calendar information (including, for example, business closings, holidays, weekends) and any real-time changes thereto. Delivery data 124-4 can include, for example, destination, route, geographic information, shipping/transport vehicles, and any real-time changes thereto. Fulfillment data 124-5 can include, for example, information related to receiving, processing and delivering orders (e.g., order volume, capacity, facilities, personnel, suppliers, customs), and any real-time changes thereto.

The data 124-1 to 124-5 is mined in real-time from multiple sources over the network(s) 104, so that the information processing system can react to order events as they happen. For example, data 124-1 to 124-5 can be mined from enterprises or participants involved in or affecting order processing and fulfillment, such as, but not necessarily limited to, material and equipment suppliers, manufacturing entities, warehouses, weather outlets, shipping/transportation entities, maintenance entities, sales personnel, financial institutions, electronic calendars, and/or global positioning systems.

Although the data layer 120 in the present embodiment is shown as part of the predictive services platform 105, at least a portion of the data layer 120 in other embodiments may be implemented on one or more other processing platforms that are accessible to the predictive services platform 105 over one or more networks.

In the FIG. 1 embodiment, the data layer 120 is assumed to comprise one or more storage systems configured to store information relating to processing performed and data used in the application, logic and data layers 106, 112 and 120, and relating to other functionality of the predictive services platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of predictive services platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the predictive services platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the application, logic and data layers 106, 112 and 120 and the elements thereof can each be implemented in the form of one or more LXCs running on one or more VMs. Other arrangements of one or more processing devices of a processing platform can be used to implement the application, logic and data layers as well as other components of the predictive services platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the predictive services platform 105 to reside in different data centers. Numerous other distributed implementations of the predictive services platform 105 are possible.

Accordingly, one or each of the application, logic and data layers 106, 112 and 120 can each be implemented in a distributed manner so as to comprise a plurality of distributed components implemented on respective ones of the plurality of compute nodes of the predictive services platform 105.

Although illustratively shown as being implemented within the predictive services platform 105, components such as application, logic and data layers 106, 112 and 120 and the elements thereof in other embodiments can be implemented at least in part externally to the predictive services platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as application, logic and data layers 106, 112 and 120 and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for the predictive and machine learning services can be offered to cloud infrastructure customers or other users as part of FaaS and/or PaaS offerings.

FIG. 2 is a diagram showing machine learning modules utilized in a predictive services platform in an illustrative embodiment. In general, machine learning techniques and components used in accordance with embodiment of the present invention may include, but are not necessarily limited to, a Support Vector Machine (SVM), a Multilayer Perceptron (MLP), a deep learning model, decision trees, clustering and a neural network. In accordance with an embodiment of the present invention, the elements shown in FIG. 2 are included in the logic layer 112 shown in FIG. 1, and more specifically, in the training module 116. Although the components of FIG. 2 in the present embodiment are described as being part of the logic layer 112 and the training module 116, at least part of the FIG. 2 components in other embodiments may be implemented on one or more other processing platforms that are accessible to the predictive services platform 105 over one or more networks.

Referring to FIG. 2, data including, for example, order lifecycle (e.g. order stage) data 202, order data 204, product hierarchy data 206, customer information 208, any of the data types 124-1 to 124-5 discussed herein, or other types of relevant data are input into at least one sparse matrix 210. More specifically, when using conventional methods, much of the data is from sources that render the data unusable for performing the machine learning to develop the delivery date prediction metrics associated with the embodiments of the present invention. In order to solve this problem, one or more sparse matrices 210 are used to organize the data into a wide format embodied by the sparse matrix 210. For example, in accordance with an embodiment of the present invention, the sparse matrix 210 may have hundreds of thousands of columns. More specifically, in a non-limiting illustrative example, data encountered in connection with the problem of generating delivery dates has a large number of timestamps defining, for example, when an order was placed, when a payment method went on hold, when the hold cleared, when the order went into production or time periods of other events within an order fulfillment cycle. Across the data, the type and number of these timestamps is arbitrary and unknown, rendering the data unusable. Conventional processes, which do not use a sparse matrix, discard the unusable data, pick out a subset of the data which may seem important, and/or arbitrarily reduce the amount of this data, leading to inaccurate or incomplete analysis. In contrast, embodiments of the present invention retain all of the timestamped data and organize the data out into a wide data format, which may comprise, for example, hundreds of thousands of columns of a sparse matrix respectively indicating, for example, specific time periods and/or relative time periods of events within an order fulfillment cycle.

In another non-limiting illustrative example, data encountered in connection with the problem of generating delivery dates has a large number of SKU lists for each order, and like the timestamps, the type and number of the SKU lists for data sources are also arbitrary and unknown, rendering the data unusable. Like with the timestamped data, embodiments of the present invention retain all of the data including the SKU lists and organize the data out into a wide data format, which may comprise, for example, hundreds of thousands of columns of a sparse matrix respectively indicating, for example, a SKU and under the column, a count of the number of that SKU for respective orders, effectively providing a fingerprint for each order based on the SKUs in an order.

As used herein, a "sparse matrix" refers to a matrix where most of the elements in the array are zero. A "dense matrix" refers to a matrix where most of the elements in the array are nonzero. As noted herein, a sparse matrix requires less storage than a conventional dense matrix, and sparse data is more easily compressed than dense data. The embodiments of the present invention utilize specialized algorithms and data structures to take advantage of the structure of the sparse matrix to increase result accuracy and processing speed, and to use less memory when compared to conventional systems using dense-matrix structures and algorithms.

Heuristics, data cleansing and transformation modules 212, 214 and 216, respectively, filter data of the sparse matrix 210 to reduce the size of sparse matrix 210 (e.g., from hundreds of thousands to tens of thousands of columns), which further reduces an amount of memory and processing capacity required for running the predictive models of the embodiments of the present invention, and reduces or prevents "out of memory" errors. The heuristics module 212 uses heuristic functions based on rules, which can be machine learned and/or programmed, in order to determine which data to retain for use in the predictive models. The heuristics are particular to the embodiments of the present invention, and are developed based on how the data is presented. For example, in keeping with the above examples, if there is a rarely used timestamp or SKU that, due to its low frequency of occurrence, will not provide enough information to build any meaningful metrics around that data, the column and/or portions of the array relating to that timestamp or SKU are preemptively removed from the sparse matrix 210. A low frequency of occurrence may be determined if the frequency of occurrence is, for example, below a predetermined threshold. Other heuristics can include removing columns that are basically all ones, removing variables that are significantly more correlated with time than with outcome, removing variables that have very different distributions (e.g., beyond a predetermined threshold) in validation versus training sets, and removing variables with uniform distributions.

The data cleansing module 214 detects and corrects or removes corrupt and/or inaccurate records from the sparse matrix 210. For example, the data cleansing module 214 may identify incomplete, incorrect, inaccurate and/or irrelevant parts of the data and then replace, delete or modify the problematic data. The transformation module 216 transforms data points in the sparse matrix 210 using arithmetic functions (e.g., powers, squares, ratios) to create new features and more closely fit within the statistical and logical parameters of the predictive models being executed.

In accordance with an embodiment of the present invention, the filtered data from the heuristics, data cleansing and transformation modules 212, 214, and 216 is processed through a plurality of decision trees 220. By way of non-limiting illustrative example, FIG. 2 shows decision trees 220-1, 220-2, 220-3, 220-4 and 220-5. However, it is to be understood that the embodiments of the present invention are not limited thereto, and can include additional or alternative decision trees having different structures and relating to different outcomes. The illustrated decision trees 220-2 and 220-3 run algorithms based on different data to provide outcomes corresponding to the number of days to ship an order, and the illustrated decision trees 220-1, 220-4 and 220-5 run algorithms based on different data to provide outcomes corresponding to the number of days to deliver an order. Accordingly, different decision trees use different variables and can be trained on different outcomes. For example, decision trees 220-1, 220-4 and 220-5 use different variables from each other corresponding to, for example, product family, brand, segment, line-of-business (LOB), supply chain, lead time, stock/custom orders, logistics, air/ground shipping, holidays, and schedules to provide predictions regarding the number of days to deliver an order. Decision trees 220-2 and 220-3 use different variables from each other corresponding to, for example, customers, company number ("conum," e.g., business segment (small business, consumer, etc.)), payment, price, manufacturing (e.g., factory information), inventory, part availability/shortages, customization and "S and P" (software and accessories attached to an order) to provide predictions regarding the number of days to ship an order. Other decision trees may use other variables, and may be used to predict, for example, time to manufacture or assemble a product, time to receive parts or inventory, and/or any other factors affecting delivery date of an order.

The decision trees 220 model decisions and their possible consequences, and correspond to algorithms including conditional control statements. The nodes of the decision trees 220, illustrated as circles with an "x" or "check mark", represent a test on an attribute (e.g. whether the attribute is true or false, yes or no, etc.), and each branch (illustrated as lines) represents the outcome of the test. The "x" and "check mark" in each node respectively illustrate negative and positive outcomes.

In accordance with an embodiment, the decision trees process each variable for a selected portion of the data and output new information relevant to the calculation of an RDD. The output of the new information can result in actions such as, for example, generating the RDDs and transmitting communications and alerts of the generated RDDs over networks to the appropriate parties.

In accordance with an embodiment of the present invention, the decision trees 220 comprise a plurality of boosted decision trees, which form a prediction model. The plurality of boosted decision trees are combined into a single stronger predictor in an iterative fashion using gradient boosting techniques. More specifically, the decision trees 220 determine which data variables to use and are most important to their outcomes. In accordance with an embodiment of the present invention, the decision trees analyze the variables that remain in a set that can reduce the variability (e.g., chaos or disorder) in the outcome.

Referring to FIG. 2, outputs from the decision trees 220 are input into a neural network 230. For example, in accordance with an embodiment of the present invention, the neural network refers to a feed-forward artificial neural network used in machine learning in which the connectivity patterns between its neurons (e.g., nodes) are arranged in a particular way that they can mathematically be described. For example, the neural network 230 may comprise a convolutional neural network (CNN) where the connectivity patterns between its neurons are arranged in such a way that they can mathematically be described by a convolution operation.

The neural network 230 is designed to learn (e.g., progressively improve performance on) tasks by considering examples, generally without task-specific programming. For example, in accordance with embodiments of the present invention, based on an ensemble of results from the decision trees 220, which identify the most relevant parameters affecting RDD, as well as the delay which may result from those parameters being true, the neural network 230 can develop and map certain metrics to a desired distribution. For example, in accordance with an embodiment of the present invention, the neural network 230 develops early, late and on-time metrics for use by predictive models in connection with generating RDD predictions. The neural network 230 is configured to perform its learning operations without any previous knowledge about the parameters and their effects.

Each connection between artificial neurons of the neural network 230 can transmit a signal from one neuron to another neuron. In accordance with an embodiment of the present invention, the artificial neuron that receives the signal can process the signal and then signal artificial neurons connected to it. An output of each artificial neuron can be calculated by a non-linear function of the sum of its inputs. Artificial neurons and connections may have a weight that adjusts as learning proceeds, which will increase or decreases the strength of a signal at a connection.

In accordance with an embodiment of the present invention, in a training mode, using historical data including known correct RDDs based on data over a given time period (e.g., one year), the decision trees 220 determine which data variables to use and are most important to the correct outcomes. In accordance with an embodiment of the present invention, using gradient boosting techniques, the decision trees analyze the variables that remain in a set that can reduce the variability (e.g., chaos or disorder) in the outcome to reach the correct outcomes. After processing by the neural network, the trained models are output to the model training output module 240.

In accordance with an embodiment of the present invention, as orders are delivered, actual delivery dates of those orders are captured as delivery data 124-4 and maintained in the data layer 122. Based on data over a given time period (e.g., one year), a model scoring module 250 generates data regarding which trained models produce the most accurate outcomes to the actual RDDs. Depending on the results, which can be provided to data scientists using the data science platform 118, data scientists can evaluate efficacy of data sources and manage versioning of data science models to produce desired and most accurate outcomes. In addition, the system can automatically determine, or the data scientist can determine, based on model performance, which models to use to obtain particular outcomes when provided with a certain universe of data.

FIG. 3 is a block diagram of a data science platform architecture in an illustrative embodiment. Referring to FIG. 3, a data science platform, such as data science platform 118, includes a load balancer 302, a frontend layer 310, a data layer 320 and an execution layer 330. The load balancer 302 distributes workloads across different computing resources of the data science platform. The frontend layer 310 includes, for example, interfaces 312 for users, such as data scientists, accessing the data science platform. The interfaces can include, but are not necessarily limited to, web interfaces and APIs enabling collaboration, experimentation, use of data sources, performance measurement and management of versioning of data science models. The frontend layer 310 further includes a dispatcher 314, which comprises a control center used for scheduling of model executions.

The frontend layer 310 also includes a Git server 316, which is used to control revisions of code, data and results. The Git server 316 executes Git software, or another version control system, which tracks changes in computer files and code. The Git server 316 is configured to enable storage of software code history, and can provide functionality for coordinating work on files between multiple users. The frontend layer 310 includes a container registry 318 (e.g., Docker registry), which maintains container images (e.g., Docker images) for containerization of user code on user chosen compute environments. Code can be run in containers (e.g., Docker containers) which are configured to create shared and reusable compute environments.

The data layer 320 comprises a database 322, a replica storage module 324 and a blob storage module 326. The database 322 includes a database service, such as, but not necessarily limited to GCE Cloud Storage, Microsoft Azure Blob Storage, DynamoDB, MongoDB, Amazon Aurora and Oracle database, which provides central configuration storage, including user and organizational information and run history. A replica storage module 324 provides duplicate storage of essential files and applications. The blob storage module 326 provides storage of large amounts of unstructured object data, including, for example, text or binary data, which can be accessed via HyperText Transfer Protocol (HTTP) or HyperText Transfer Protocol Secure (HTTPS).

The execution layer 330 comprises further hardware and software required for running the data science platform, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The operation of the information processing system 100 will now be described in further detail with reference to the flow diagram of FIG. 4. The process as shown includes steps 401 through 411, and is suitable for use in the system 100 but is more generally applicable to other types of information processing systems comprising predictive services platforms configured to generate RDDs.

In step 401, a request is received, for example, at the predictive services platform 105, to execute one or more predictive models for generating a delivery date (e.g., an RDD). Referring to steps 403 and 405, execution of the one or more predictive model, for example, via the execution module 116, is initiated responsive to the request, and a plurality of machine learning algorithms using data from a plurality of data sources are invoked when executing the one or more predictive models. As noted herein, the data includes a wide variety of data including, for example, supply chain data 124-1, order data 124-2, lead time data 124-3, delivery data 124-4 and/or fulfillment data 124-5. The predictive models utilize decision trees (e.g., decision trees 220) which may use different variables from each other to find the same outcome (e.g., number of days to ship, number of days to deliver), or to find different outcomes. Neural network(s) (e.g., neural network 230) are used to optimally combine results from the one or more decision trees.

In step 407, the data is captured from the plurality of data sources via, for example, the data hub 122, and organized into a sparse matrix (e.g., sparse matrix 210). As noted herein, in accordance with an embodiment of the present invention, all of the data can be retained in the sparse matrix, which may include hundreds of thousands of columns. According to an embodiment of the present invention, heuristics can be used to reduce a size of the sparse matrix. As described herein, in a non-limiting embodiment of the present invention, the heuristics remove data corresponding to timestamps and/or SKU codes having a frequency determined to be less than a given threshold.

Referring to steps 409 and 411, as a result of execution of the one or more predictive models, the delivery date is automatically generated (e.g., using RDD engine 107 and execution module 114) and automatically transmitted, for example, over a network (e.g., network 104) using communications manager 109, to one or more user devices. In accordance with an embodiment of the present invention, the captured data includes real-time changes to one or more order conditions, and the automatically generated delivery date is based on the real-time changes to the one or more order conditions.

According to an embodiment of the present invention, the one or more predictive models run on a data science platform (e.g., data science platform 118) configured to provide an interactive workspace for a plurality of data scientists electronically accessing the data science platform. The data science platform can be configured to manage versioning of the one or more predictive models, measure performance of the one or more predictive models, and/or execute experiments on the one or more predictive models.

In accordance with an embodiment of the present invention, the one or more predictive models are trained based on historical data comprising actual delivery dates. The training can include training the one or more decision trees on different outcomes.

Figure 4:
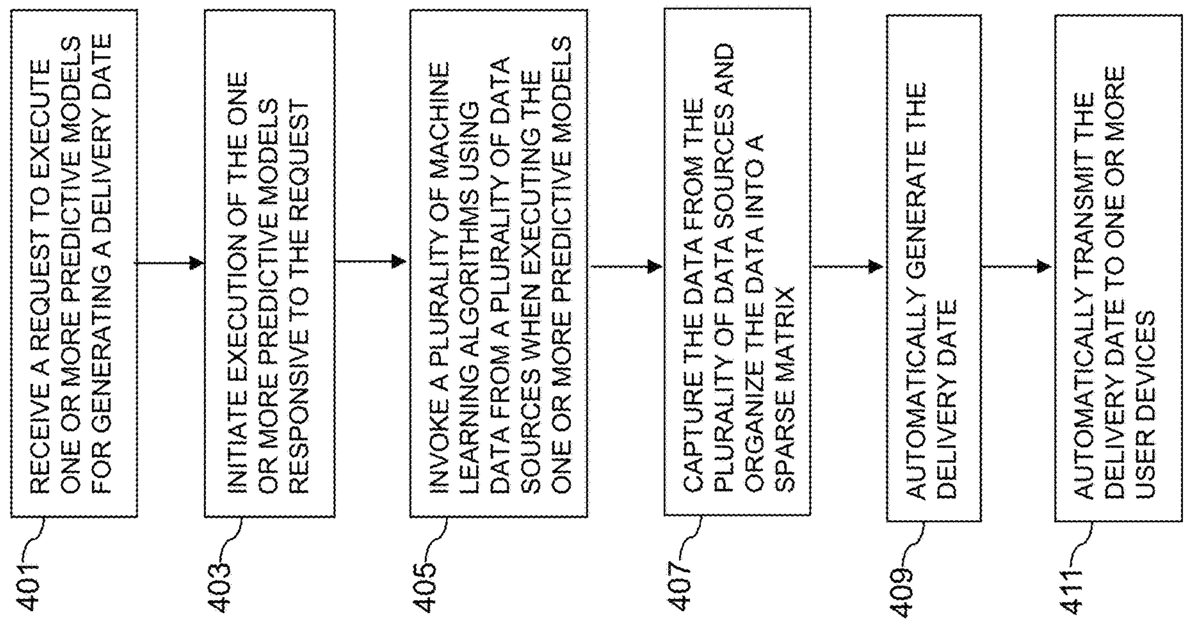
FIG. 4 is a flow diagram of a process utilizing machine learning for automatic generation of RDDs in a predictive services environment in an illustrative embodiment.

It is to be appreciated that the FIG. 4 process and other features and functionality described above can be adapted for use with other types of information systems configured to execute predictive services on a predictive services platform or other type of processing platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a predictive services platform as disclosed herein can provide a number of significant advantages relative to conventional arrangements. For example, some embodiments are configured to use of a unique combination of machine learning algorithms, which rely on an expanded set of data attributes for prediction relative to conventional methods, to calculate more accurate RDDs. Further, as noted herein, the embodiments of the present invention utilize a sparse matrix to capture a wide set of attributes that would be unusable and discarded when using conventional methods. The use of the sparse matrix also causes large memory reductions relative to conventional arrangements. Embodiments of the present invention rely on heuristics that were specially designed to filter the data which was previously discarded under conventional methods, and to reduce the size of the sparse matrix.

Embodiments of the present invention also advantageously use boosted decision trees applying different variables from each other to arrive at different date calculations based on complex product and customer data. In some cases, the different calculations may correspond to the same date category (number of days to ship, number of days to deliver, number of days to manufacture, etc.), but yield different results due to the application of different data and conditions in the decision trees affecting the results. In other cases, the different calculations may correspond to different date categories and yield different results based on the application of data relevant to the different categories.

Embodiments of the present invention utilize one or more neural networks to optimize the results from the decision trees, and use historical data to train the predictive models and score the models against actual delivery date to define early, on time and late metrics.

Embodiments of the present invention further provide a data science platform (e.g., a cloud-based data science platform) that advantageously supports collaboration between data scientists, experimentation, re-using of data sources, and performance measurement and version management of predictive models.

Embodiments of the present invention advantageously provide a scalable, high velocity, and highly available database of order information structured specifically for data science. Such embodiments advantageously use real-time updates from an expanded universe of data to significantly improve accuracy and efficiency in RDD generation.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

FIGS. 5A, 5B, 5C, 5D, 5E and 5F respectively show examples of pseudocode 501, 503, 505, 507, 509 and 511 for generating a sparse matrix in illustrative embodiments. For example, pseudocode 501 corresponds to turning a dataset into a sparse matrix if it is not already a sparse matrix, and pivoting data out based on key. Pseudocode 503 corresponds to pivots that instead of using one-hot encoding factors, aggregates data based on another numeric, such as, for example, dollars spent by LOB, ship quantity by SKU, etc. Pseudocode 505 corresponds to training set creation, where each dataset is pivoted into a sparse matrix according to instructions contained in a dataset file. Pseudocode 507 corresponds to joining each of a plurality of sparse matrices together based on dataset keys. Pseudocode 509 corresponds to filtering out NA values (e.g., missing, not available), creating transforms on true numeric columns, generating transformations based on single columns or combinations of columns, and join in transforms. Pseudocode 511 corresponds to ordering a dataset by an "orderBy" column (typically a date field). Otherwise, logic is used to order the dataset randomly.

FIGS. 6A, 6B, 6C and 6D respectively show examples of pseudocode 601, 603, 605 and 607 for implementation of heuristics in illustrative embodiments. For example, pseudocode 601 corresponds to removing columns from the sparse matrix that do not occur a minimum number of times, or removing columns that are basically all ones. Pseudocode 603 corresponds removing matrix variables that are significantly more correlated with time than with outcome. Pseudocode 605 corresponds to removing matrix variables that have very different distributions (e.g., beyond a predetermined threshold) in validation versus training sets, and pseudocode 607 corresponds to removing matrix variables with uniform distributions.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the predictive services platform 105 or portions thereof are illustratively implemented for use by tenants of such a multi-tenant environment.

As mentioned previously, cloud infrastructure as disclosed herein can include cloud-based systems such as AWS, GCE and Windows Azure. Virtual machines provided in such systems can be used to implement at least portions of one or more of a computer system and a content addressable storage system in illustrative embodiments. These and other cloud-based systems in illustrative embodiments can include object stores such as AWS S3, GCE Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing predictive services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
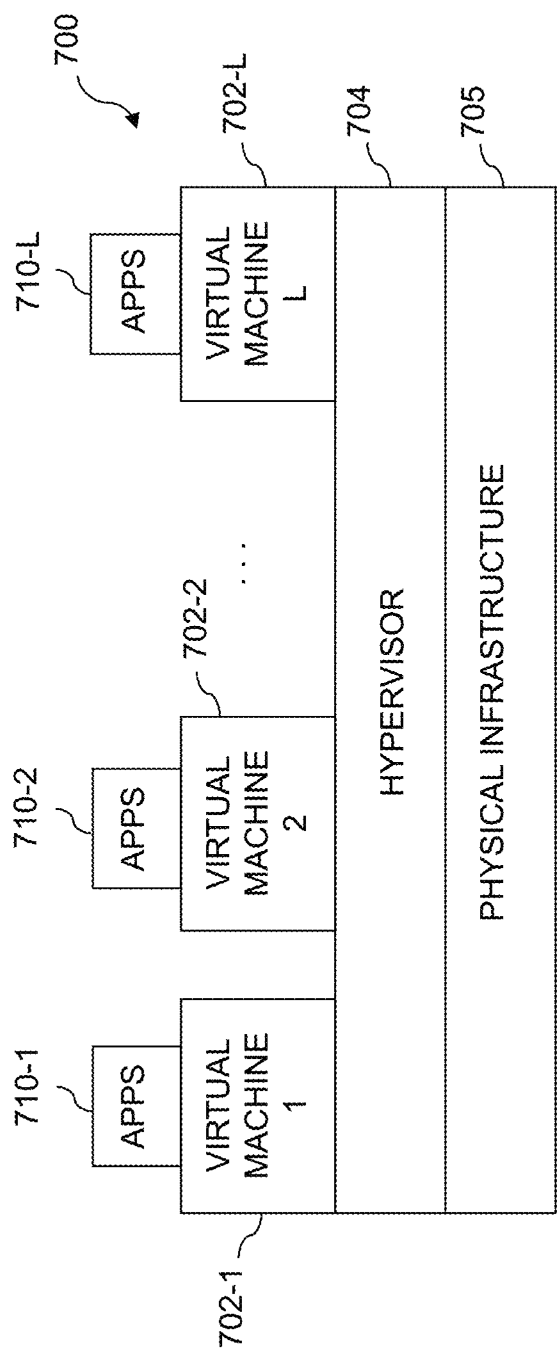
FIGS. 7 and 8 show examples of processing platforms that may be utilized to implement at least a portion of an information processing system in illustrative embodiments.
Figure 8:
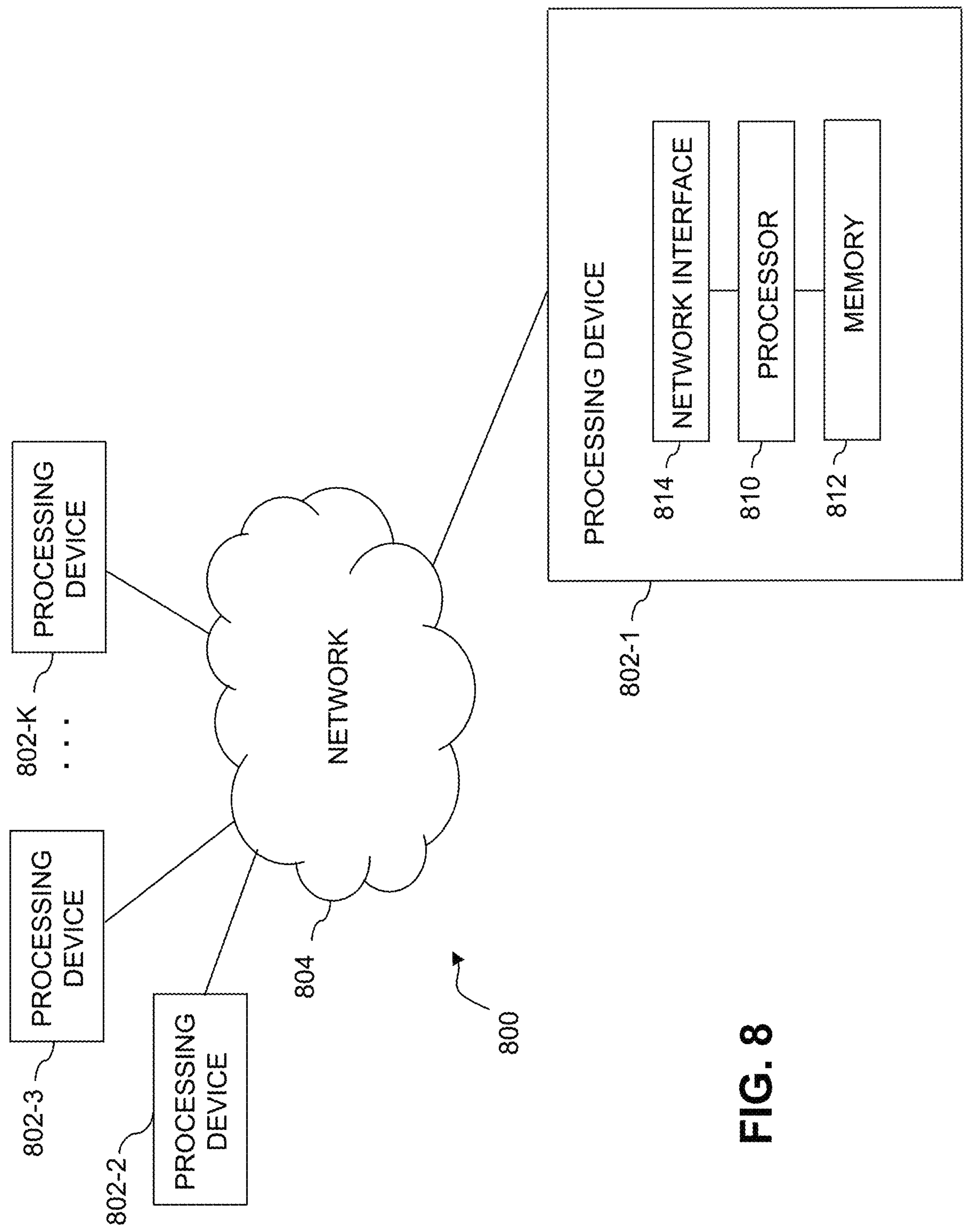

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the predictive services platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and predictive services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing platform comprising a plurality of processing devices;

said at least one processing platform being configured:

to receive a request to execute one or more predictive models for generating a delivery date;

to initiate execution of the one or more predictive models responsive to the request;

to invoke a plurality of machine learning algorithms using data from a plurality of data sources when executing the one or more predictive models;

to capture the data from the plurality of data sources and organize the data into a sparse matrix;

to automatically generate the delivery date; and to automatically transmit the delivery date to one or more user devices.

2. The apparatus of claim 1 wherein the one or more predictive models use one or more decision trees.

3. The apparatus of claim 2 wherein the one or more decision trees use different variables from each other to determine an outcome.

4. The apparatus of claim 2 wherein the one or more predictive models use a neural network to optimally combine results from the one or more decision trees.

5. The apparatus of claim 1 wherein the captured data includes real-time changes to one or more order conditions, and wherein the automatically generated delivery date is based on the real-time changes to the one or more order conditions.

6. The apparatus of claim 1 wherein said at least one processing platform is further configured to reduce a size of the sparse matrix.

7. The apparatus of claim 6 wherein said at least one processing platform is further configured to use one or more heuristics to reduce the size of the sparse matrix.

8. The apparatus of claim 7 wherein the one or more heuristics remove data corresponding to at least one of a timestamp and a stock keeping unit (SKU) code having a frequency determined to be less than a given threshold.

9. The apparatus of claim 1 wherein the one or more predictive models run on a data science platform.

10. The apparatus of claim 9 wherein the data science platform is configured to provide an interactive workspace for a plurality of data scientists electronically accessing the data science platform.

11. The apparatus of claim 9 wherein the data science platform is configured to at least one of manage versioning of the one or more predictive models, measure performance of the one or more predictive models, and execute experiments on the one or more predictive models.

12. The apparatus of claim 1 wherein said at least one processing platform is further configured to train the one or more predictive models based on historical data comprising actual delivery dates.

13. The apparatus of claim 12 wherein the one or more predictive models use one or more decision trees, and wherein the training comprises training the one or more decision trees on different outcomes.

14. The apparatus of claim 1 wherein the data comprises at least one of supply chain data, order data, lead time data, delivery data and fulfillment data.

15. A method comprising:

receiving a request to execute one or more predictive models for generating a delivery date;

initiating execution of the one or more predictive models responsive to the request;

invoking a plurality of machine learning algorithms using data from a plurality of data sources when executing the one or more predictive models;

capturing the data from the plurality of data sources and organizing the data into a sparse matrix;

automatically generating the delivery date; and automatically transmitting the delivery date to one or more user devices;

wherein the method is performed by at one processing platform comprising at least one processing device comprising a processor coupled to a memory.

16. The method of claim 15 further comprising training the one or more predictive models based on historical data comprising actual delivery dates.

17. The method of claim 16 wherein the one or more predictive models use one or more decision trees, and wherein the training comprises training the one or more decision trees on different outcomes.

18. A computer program product comprising a non-transitory processor-readable storage medium having stored therein program code of one or more software programs, wherein the program code when executed by at least one processing platform causes said at least one processing platform:

to receive a request to execute one or more predictive models for generating a delivery date;

to initiate execution of the one or more predictive models responsive to the request;

to invoke a plurality of machine learning algorithms using data from a plurality of data sources when executing the one or more predictive models;

to capture the data from the plurality of data sources and organize the data into a sparse matrix;

to automatically generate the delivery date; and to automatically transmit the delivery date to one or more user devices.

19. The computer program product of claim 18 wherein the program code when executed by said at least one processing platform further causes said at least one processing platform to train the one or more predictive models based on historical data comprising actual delivery dates.

20. The computer program product of claim 19 wherein the one or more predictive models use one or more decision trees, and wherein the training comprises training the one or more decision trees on different outcomes.

* * * * *